United States Patent [19]
Lin

[11] Patent Number: 5,868,442
[45] Date of Patent: Feb. 9, 1999

[54] PIPE JOINT FIXING RING

[76] Inventor: Yen-Tseng Lin, No. 208-4, Chao Nan Rd., Chu Nan, Miao Li Hsien, Taiwan

[21] Appl. No.: 889,103

[22] Filed: Jul. 7, 1997

[51] Int. Cl.⁶ .................................................... F16L 17/06
[52] U.S. Cl. .......................................... 285/367; 285/411
[58] Field of Search ...................................... 285/411, 367

[56] References Cited

U.S. PATENT DOCUMENTS

| | | | |
|---|---|---|---|
| 2,640,717 | 6/1953 | Scheuring | 285/411 |
| 4,781,406 | 11/1988 | Hubener | 285/411 X |
| 5,499,849 | 3/1996 | Fend | 285/411 |
| 5,707,089 | 1/1998 | Fend | 285/411 |

FOREIGN PATENT DOCUMENTS

| | | | |
|---|---|---|---|
| 27406 | 4/1981 | European Pat. Off. | 285/411 |
| 1164320 | 10/1958 | France | 285/411 |

Primary Examiner—Dave W. Arola
Attorney, Agent, or Firm—Rosenberg, Klein & Bilker

[57] ABSTRACT

The subject invention relates to a type of pipe joints fixing ring, comprising two master fixing blocks, an adjusting bolt connecting the two master fixing blocks, several slave fixing blocks, several connecting levers linking the master and slave fixing blocks, and several rollers fixed inside the master and slave fixing blocks, the inside two surfaces of said rollers are tapered planes, two pipe joints and a center ring with an O-ring that are clamped inside the master fixing blocks and the slave fixing blocks, the surfaces contacting the two joints and the rollers are tapered planes, so that by rotating to adjust the distance between the two master fixing blocks, the tapered planes on the rollers inside the master fixing blocks and the slave fixing blocks will push the tapered planes on the two joints, thus the two joints are securely tightened, to enable such integral features as evenly distributed tightening force, labor-saving tightening process and wider range of applications.

1 Claim, 4 Drawing Sheets

5,868,442

PIPE JOINT FIXING RING

BACKGROUND OF THE INVENTION

The subject invention relates to a type of pipe joints fixing ring, particularly to a fixing ring that will have the features of labor-saving tightening process, even distribution of tightening force and wider range of applications.

DESCRIPTION OF PRIOR ART

Referring to FIG. 1 which is the perspective view of a prior art of pipe joint fixing ring, said conventional fixing ring comprises two semi-circle braces 10a, the ends of the two braces 10a being hinge-joined, while the other ends can be opened or tightened together by a bolt 11a, the joints 12a of the two pipes can be accommodated inside the two semi-circle braces, and between the two joints is a center ring 14a with an O-ring 13a, so by tightening the bolt 11a, the two joints 12a can be tightened together to accomplish the connection of two pipes. The tightening method of said conventional pipe joints fixing ring by means of sliding lock and single-location tightening by the bolt 11a, however, is relatively labor consuming, and the uneven tightening force will not effect a secure tightening effect. Besides, it is applicable only to smaller pipes.

SUMMARY OF THE INVENTION

The main purpose of the subject invention is to provide a type of pipe joints fixing ring, comprising two master fixing blocks, an adjusting bolt connecting the two master fixing blocks, several slave fixing blocks, several connecting levers linking the master and slave fixing blocks and several rollers installed inside the master and slave fixing blocks, the contacting surfaces of the joints and the two sides inside of the rollers being tapered planes, so that, by adjusting the distance between the two master fixing blocks, the tapered planes inside the rollers in the master and slave fixing blocks will push the tapered planes on the two joints to tighten the two joints securely. The subject invention has the features by utilizing several rollers for the tightening function, multiple tightening locations to enable evenly distributed tightening force, as well as variation of moment of force to enable multiple forces effect, labor-saving tightening process, etc., so that it has a wider range of applications to large or small pipes.

The designing methods and functions adopted in the subject invention to achieve the above purposes and configuration are described in details below with the drawing of preferred embodiment:

| Brief Description of Numerals | |
| --- | --- |
| 10 master fixing block | 11 adjusting bolt |
| 12 slave fixing block | 13 connecting lever |
| 14 roller | 15 shaft part |
| 16 positioning part | 17 C-ring |
| 18 threaded part | 19 pin shaft |
| 20 tapered side | 21 connecting shaft |
| 22 joint | 23 tapered side |
| 24 O-ring | 25 center ring |
| 10a block | 11a bolt |
| 12a joint | 13a O-ring |
| 14a center ring | |

DETAILED DESCRIPTION OF PREFERRED EMBODIMENT

Figure 1:
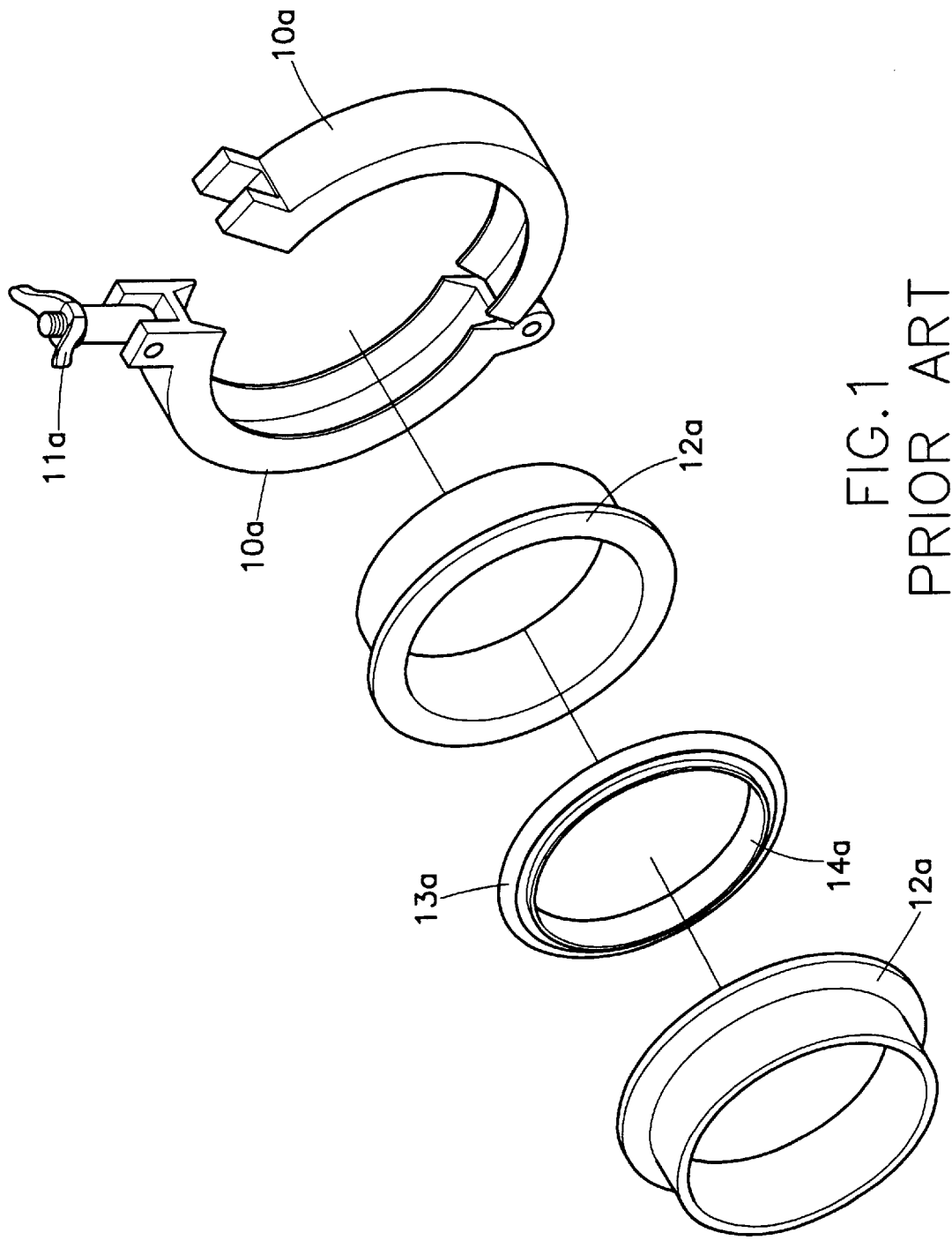
FIG. 1 is the perspective view of a prior art of pipe joints fixing ring.
Figure 2:
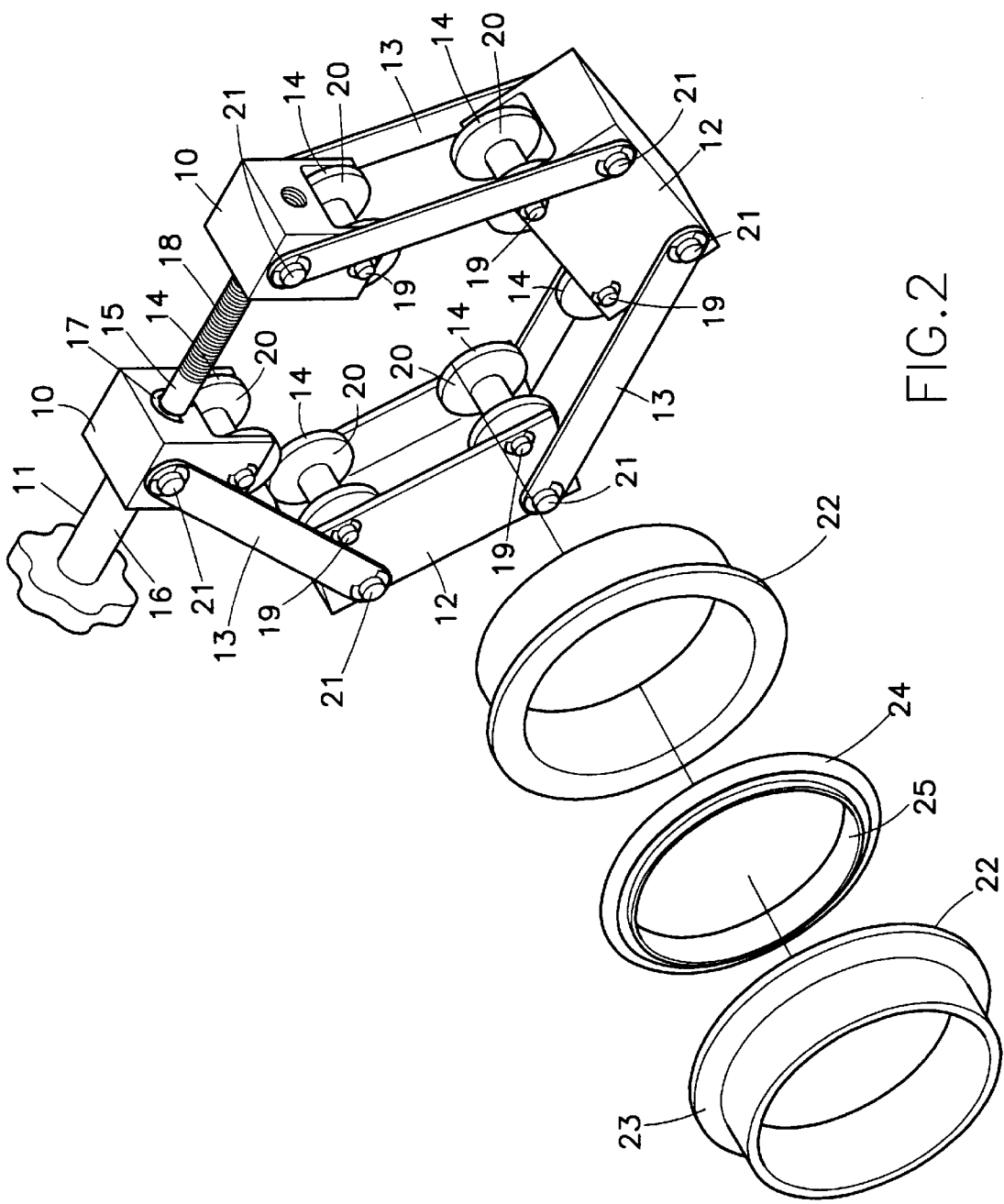
FIG. 2 is the perspective view of the subject invention.
Figure 3:
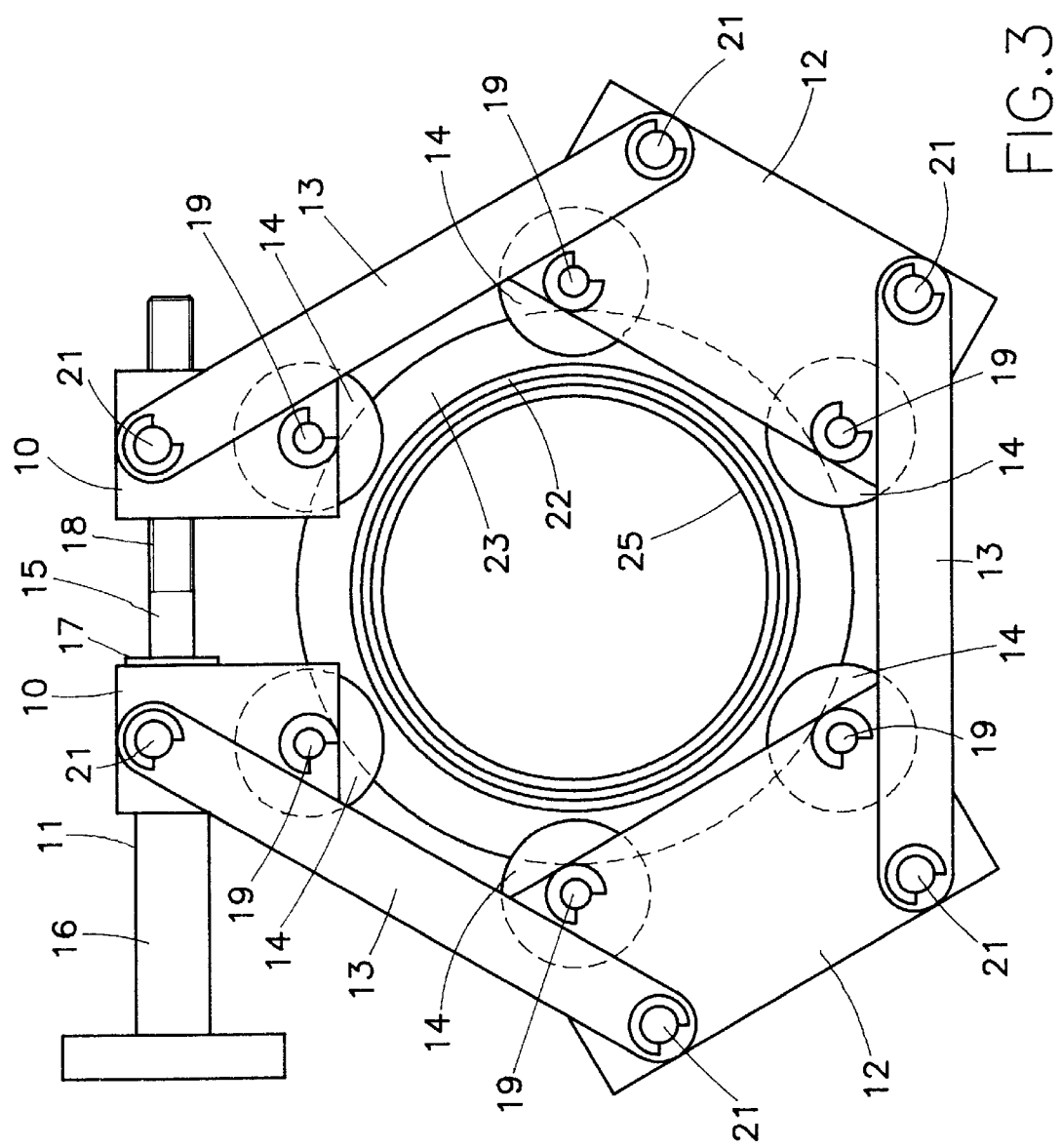
FIG. 3 is the front view of the subject invention.
Figure 4:
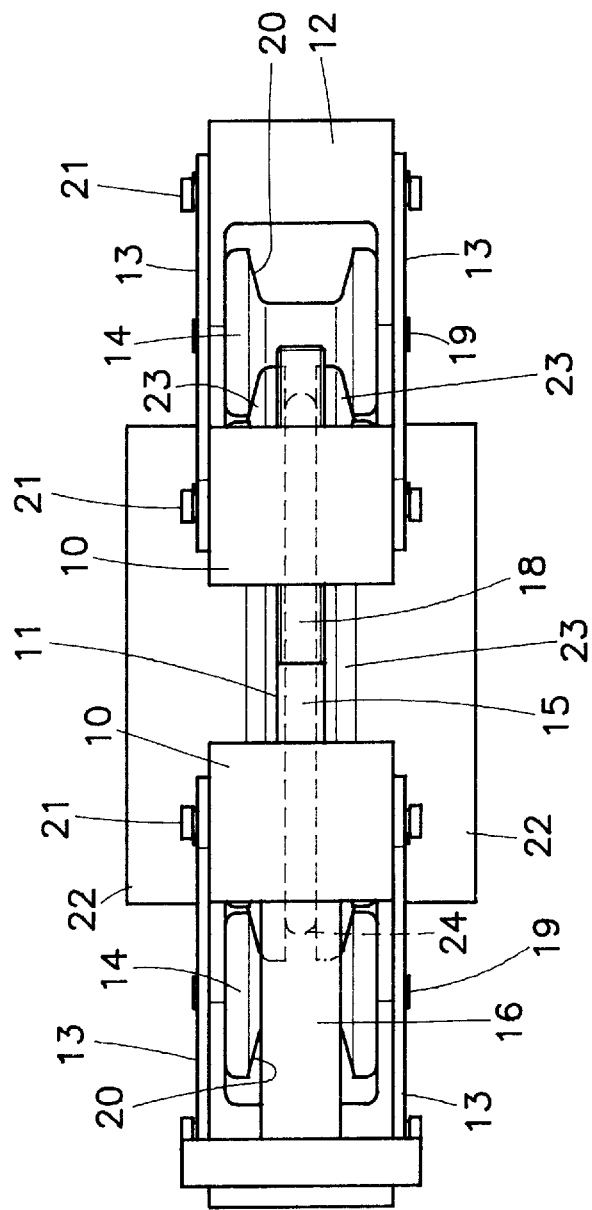
FIG. 4 is the top view of the subject invention

Referring to FIGS. 2, 3 and 4 which are respectively the perspective view, the front view and the top view of the subject invention, the subject invention is to provide a type of pipe joints fixing ring, comprising two master fixing blocks 10, an adjusting bolt 11 connecting the two master fixing blocks 10, two or more (two in the subject example) slave fixing blocks 12, several connecting levers 13 linking the master and slave fixing blocks 10 and 12, and several rollers 14 installed inside the master and slave fixing blocks 10 and 12, wherein the master fixing block 10 is a depressed cube in which is a roller 14 fixed by a pin shaft 19, on the master fixing block is appropriately fixed an adjusting bolt 11, the adjusting bolt 11 has a shaft part 15 which penetrates the master fixing block 10, one end of the shaft part 15 is a positioning part 16 with a larger outer diameter, the other end of the shaft part 15 is fixed by a C-ring 17, so that the adjusting bolt 11 is securely positioned on the master fixing block 10 to facilitate its rotation and adjustment, the other end of the adjusting bolt 11 is a threaded part 18 which is screwed to another master fixing block 10, so that by rotating the adjusting bolt 11, the distance between the two master fixing blocks can be adjusted and changed, by means of the threading effect.

The slave fixing block 12 has a depressed center to accommodate two rollers 14 each fixed by a pin shaft 19. The inside surfaces of the rollers 14 in the master and slave fixing blocks 10 and 12 are tapered sides 20. Linking between the master fixing block 10 and the slave fixing block 12, and between the slave fixing blocks 12, are the connecting levers 13, the two ends of the connecting levers are linked by connecting shafts 21 onto the master fixing blocks 10 and the slave fixing blocks 12, to comprise the pipe joints fixing ring with multiple-force effect.

The joints 22 of the two pipes are put inside the master fixing blocks 10 and the slave fixing blocks 12, the surfaces of the joints and of the rollers contacting each other are tapered sides 23, between the two joints 22 is a center ring 25 with an O-ring 24 to increase fastening effects.

With the subject invention, we can rotate the adjusting bolt 11 to adjust the distance between the two master fixing blocks, meanwhile, the connecting levers 13 will drive the slave fixing blocks 12 to move inwards or outwards. When the distance between the two master fixing blocks 10 is shortened, the connecting levers 13 will drive the slave fixing blocks to move inward to the center. When the distance between the two master fixing blocks is lengthened, the connecting levers 13 drive the slave fixing blocks 12 to move away from the center. When the adjusting bolt 11 is rotated and the distance between the two master fixing blocks 10 is shortened, the connecting levers 13 drive the slave fixing blocks to move inward to the center, so the tapered sides 20 on the rollers 14 inside the master fixing blocks 10 and the slave fixing blocks 12 push against the tapered planes 23 on the two joints 22, so by inclined-plane effect, the two joints 22 are squeezed together to tighten the O-ring 24 and fasten the two joints 22 securely.

The subject invention involves many features by utilizing several rollers 14 for tightening function; multiple-location tightening effect to enable evenly distributed tightening force; the rollers 14 can apply positive pressure on the joints 22; while the adjusting bolt 11 is located outside the rollers 14; the moment of force between the adjusting bolt 11 and the joints 22 is larger than the moment of force between the rollers 14 and the joints 22, so by varying the moment of force, it will have multiple-force effect; more labor-saving tightening process to enable more secure tightening on the joints 22; it can be applied to large or small pipes, so its range of applications is widened.

Summing up, the subject invention is indeed an improvement on such disadvantages of conventional pipe joints fixing rings as labor-consuming tightening process, uneven tightening force applied, etc., so it is indeed a rare invention with novelty and inventive step that will fully satisfy the requirements for the application of a patent right. In accordance with the patent law, this application is duly filed to protect the subject inventor's rights and interests. Your favorable consideration should be appreciated.

It has to be declared herewith that the above description, covering merely the example of preferred embodiment of the subject invention, should not be based to restrict or limit the scope of claims of the subject invention, and that all equivalent variations deriving from the subject description and drawings shall be reasonably included in the intent and scope of claims of the subject invention.

I claim:

1. A pipe joint fixing ring, comprising:

a pair of master fixing blocks, each of said pair of master fixing blocks having a longitudinally extended recess formed in a first end portion thereof, a first of said pair of master fixing blocks having a longitudinally directed bore extending therethrough and a second of said pair of master fixing blocks having a longitudinally directed threaded opening formed therein;

a pair of first rollers, each of said pair of first rollers being at least partially disposed in said longitudinally extended recess of a respective one of said pair of master fixing blocks and rotatively coupled thereto adjacent said first end portion of said respective master fixing block, each of said pair of first rollers having tapered sides for interface with cooperating tapered flange portions of a pipe joint;

a pair of slave fixing blocks, each of said pair of slave fixing blocks having a longitudinally extended recess formed in a first end portion thereof;

a plurality of second rollers, a respective pair of said plurality of second rollers being at least partially disposed in said longitudinally extended recess of each of said pair of slave fixing blocks and rotatively coupled thereto adjacent said first end portion of said slave fixing block, each of said plurality of second rollers having tapered sides for interface with the cooperating tapered flange portions of the pipe joint;

first linkage means for coupling said first master fixing block to a first of said pair of slave fixing blocks, said first linkage means having one end thereof pivotally coupled to said first master fixing block adjacent a second end portion thereof and displaced from said rotative coupling of a respective first roller, said first linkage means having an opposing second end thereof pivotally coupled to said first slave fixing block adjacent a second end portion thereof and displaced from said rotative coupling of a respective pair of said plurality of second rollers;

second linkage means for coupling said first slave fixing block to a second of said pair of slave fixing blocks, said second linkage means having one end thereof pivotally coupled to said first slave fixing block adjacent said second end portion thereof and displaced from said rotative coupling of a respective pair of said plurality of second rollers, said second linkage means having an opposing second end thereof pivotally coupled to said second slave fixing block adjacent a second end portion thereof and displaced from said rotative coupling of a respective pair of said plurality of second rollers;

third linkage means for coupling said second slave fixing block to said second master fixing block, said third linkage means having one end thereof pivotally coupled to said second master fixing block adjacent said second end portion thereof and displaced from said rotative coupling of a respective first roller, said second linkage means having an opposing second end thereof pivotally coupled to said second slave fixing block adjacent said second end portion thereof and displaced from said rotative coupling of a respective pair of said plurality of second rollers; and, an adjusting bolt extending through said bore of said first master fixing block and being threadedly engaged with said threaded opening of said second master fixing block for displacing said second master fixing block and said pair of slave fixing blocks relative to said first master fixing block responsive to rotation of said adjusting bolt, wherein an O-ring disposed in the pipe joint is compressed between the flange portions of the pipe joint responsive to said displacement of said second master fixing block and said pair of slave fixing blocks.

* * * * *